US011577461B2

(12) United States Patent
Wakelam et al.

(10) Patent No.: US 11,577,461 B2
(45) Date of Patent: Feb. 14, 2023

(54) ADDITIVE MANUFACTURING SYSTEM AND METHOD

(71) Applicant: General Electric Company, Schenectady, NY (US)

(72) Inventors: Christian Wakelam, Garching (DE); Rene du Cauze de Nazelle, Garching (DE); Christian Aalburg, Garching (DE); Florian Hoefler, Garching (DE); Jonathan Ong, Garching (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/329,301

(22) Filed: May 25, 2021

(65) Prior Publication Data
US 2021/0276262 A1    Sep. 9, 2021

Related U.S. Application Data

(63) Continuation of application No. 15/961,602, filed on Apr. 24, 2018, now Pat. No. 11,014,304.

(51) Int. Cl.
*B29C 64/371* (2017.01)
*B33Y 10/00* (2015.01)
(Continued)

(52) U.S. Cl.
CPC ............ *B29C 64/371* (2017.08); *B22F 10/00* (2021.01); *B22F 12/00* (2021.01); *B28B 1/001* (2013.01);
(Continued)

(58) Field of Classification Search
CPC ......... B29C 64/00; B29C 64/10; B29C 64/20; B29C 64/30; B29C 67/00
See application file for complete search history.

(56) References Cited

U.S. PATENT DOCUMENTS 6,215,093 B1 * 4/2001 Meiners ................. B22F 12/70
                                                       219/121.84
8,752,105 B2 * 6/2014 Soloff .................. H04N 21/472
                                                       725/105
(Continued)

FOREIGN PATENT DOCUMENTS

DE    102014000022 A1    7/2015
DE    102014205875 A1    10/2015
(Continued)

OTHER PUBLICATIONS

International Search Report Corresponding to Application No. PCT/US2019/028226 dated Jul. 23, 2019.
(Continued)

*Primary Examiner* — Nahida Sultana
(74) *Attorney, Agent, or Firm* — Dority & Manning, P.A.

(57) ABSTRACT

An additive manufacturing (AM) system includes a housing defining a chamber and a build platform disposed in a lower portion of the chamber. The AM system includes an upper gas inlet disposed in a side-wall and in an upper portion of the chamber and configured to supply an upper gas flow parallel to the build platform. The AM system includes a lower gas inlet in the lower portion of the chamber, wherein the lower gas inlet includes one or more pairs of dividing walls extending from the side-wall toward the build platform and configured to guide the lower gas flow at one or more flow angles with respect to the build platform. The AM system includes at least one gas delivery mechanisms to regulate flow characteristics of the upper and lower gas flows, and includes a gas outlet to discharge the upper and lower gas flows from the chamber.

22 Claims, 5 Drawing Sheets

(51) Int. Cl.
B33Y 30/00 (2015.01)
B33Y 40/00 (2020.01)
B29C 64/153 (2017.01)
B29C 64/25 (2017.01)
B29C 64/264 (2017.01)
B28B 1/00 (2006.01)
B29C 64/245 (2017.01)
B22F 12/00 (2021.01)
B22F 10/00 (2021.01)
B22F 10/10 (2021.01)

(52) U.S. Cl.
CPC .......... B29C 64/153 (2017.08); B29C 64/245 (2017.08); B29C 64/25 (2017.08); B29C 64/264 (2017.08); B33Y 10/00 (2014.12); B33Y 30/00 (2014.12); B33Y 40/00 (2014.12); *B22F 10/10* (2021.01)

(56) References Cited

U.S. PATENT DOCUMENTS

| | | | |
|---|---|---|---|
| 9,456,884 | B2 | 10/2016 | Uckelmann et al. |
| 10,814,430 | B2 | 10/2020 | Wakelam et al. |
| 2011/0291331 | A1 | 12/2011 | Scott |
| 2016/0046075 | A1 | 2/2016 | Desimone et al. |
| 2016/0200052 | A1 | 7/2016 | Moore et al. |
| 2017/0120330 | A1 | 5/2017 | Sutcliffe et al. |
| 2017/0146382 | A1* | 5/2017 | Gold ................ B33Y 50/02 |
| 2017/0216916 | A1 | 8/2017 | Nyrhila et al. |
| 2018/0043614 | A1 | 2/2018 | Greenfield et al. |
| 2018/0133967 | A1 | 5/2018 | Bechmann et al. |
| 2020/0061653 | A1* | 2/2020 | Wakelam ............ B22F 12/70 |
| 2020/0061655 | A1* | 2/2020 | Wakelam ............ B29C 64/153 |

FOREIGN PATENT DOCUMENTS

| | | |
|---|---|---|
| EP | 3321009 A1 | 5/2018 |
| WO | WO2010/007394 A1 | 1/2010 |
| WO | WO2016/149104 A1 | 9/2016 |
| WO | WO2018/006029 A1 | 1/2018 |

OTHER PUBLICATIONS

Ly et al., Metal Vapor Micro-Jet Controls Material Redistribution in Laser Powder Bed Fusion Additive Manufacturing, Scientific Reports, Jun. 22, 2017.

* cited by examiner

ADDITIVE MANUFACTURING SYSTEM AND METHOD

CROSS-REFERENCE TO RELATED APPLICATION

This application is a continuation application of U.S. application Ser. No. 15/961,602 filed Apr. 24, 2018, titled "ADDITIVE MANUFACTURING SYSTEM AND METHOD," herein incorporated by reference.

BACKGROUND

The subject matter disclosed herein generally relates to an additive manufacturing system and method, and more specifically, to an additive manufacturing system and method that employs focused energy to selectively fuse a powder material to produce an object.

Additive manufacturing (AM) processes generally involve the buildup of one or more materials to make a net or near-net shape object, in contrast to subtractive manufacturing methods, which selectively remove material from an initial form to fabricate an object. Though "additive manufacturing" is an industry standard term (ASTM F2792), it encompasses various manufacturing and prototyping techniques known under a variety of names, including freeform fabrication, 3D printing, rapid prototyping/tooling, etc. A particular type of AM process uses a focused energy source (e.g., an electron beam, a laser beam) to sinter or melt a powder material deposited on a build platform within a chamber, creating a solid three-dimensional object in which particles of the powder material are bonded together.

Laser sintering/melting, as used in Direct Laser Sintering (DLS) and/or Direct Laser Melting (DLM), is a common industry term used to refer to producing three-dimensional (3D) objects by using a laser beam to sinter or melt a fine powder. In particular, laser sintering/melting techniques often entail projecting a laser beam onto a controlled amount of powder (e.g., a powder bed) on a substrate, so as to form a layer of fused particles or molten material thereon. When the laser beam interacts with the powder at a powder bed, smoke and/or a particulate matter (e.g., condensate, spatter) is produced within the chamber. The smoke and/or the particular matter may be detrimental to the quality of the resulting object. As an example, the suspended smoke and/or particular matter within the chamber can interfere with the laser beam and reduce the energy or intensity of the laser beam before it reaches the powder bed. As another example, the smoke and/or the particular matter may deposit onto the powder bed and may become incorporated into the resulting object.

In certain laser sintering/melting (or DLS/DLM) systems, a gas flow is introduced in an upper portion of the chamber (e.g., toward the top of the chamber in the z-direction and away from the build platform) to flow generally parallel to the build platform in an attempt to remove the smoke and/or particulate matter and prevent deposition. However, this upper gas flow may not efficiently remove the smoke and/or particulate matter in the lower portion of the chamber (e.g., toward the build platform and away from the top of the chamber in the z-direction). In addition, the upper gas flow may entrain gas from the chamber resulting in a chaotic flow with large areas of recirculation within the chamber. This chaotic flow may trap or deposit the particulate matter in various parts of the chamber, which can lower the quality of the resulting object of the DLS/DLM processes.

BRIEF DESCRIPTION

In one embodiment, an additive manufacturing (AM) system includes a housing defining a chamber, a build platform disposed in a lower portion of the chamber, and a powder application device configured to deposit a bed of powder material on the build platform. The AM system includes an upper gas inlet disposed in a first side-wall and in an upper portion of the chamber and configured to supply an upper gas flow parallel to the build platform. The AM system includes a lower gas inlet in a lower portion of the chamber, wherein the lower gas inlet includes one or more pairs of dividing walls extending from the first side-wall towards the build platform and configured to guide the lower gas flow at one or more flow angles with respect to the build platform. The AM system includes one or more gas delivery mechanisms coupled to the upper and lower gas inlets and configured to regulate one or more flow characteristics of the upper and lower gas flows. The AM system also includes a gas outlet disposed in a second side-wall of the chamber, opposing the first side-wall, wherein the gas outlet is configured to discharge the upper and lower gas flows from the chamber.

In another embodiment, a method of operating an additive manufacturing system includes depositing a bed of a powder material on a build platform within a chamber. The method includes supplying an upper gas flow into the chamber horizontally above the build platform and supplying a lower gas flow into the chamber towards the build platform. The method also includes applying a focused energy beam to at least a portion of the bed of the powder material deposited on the build platform to form a solidified layer.

In another embodiment, an additive manufacturing (AM) system includes a housing defining a chamber, a build platform disposed in the chamber, and a powder application device arranged in the chamber and configured to dispose a bed of powder material onto the build platform. The AM system includes an energy generating system arranged in the chamber and configured to generate and direct a focused energy beam onto at least a portion of the bed of powder material. The AM system includes a positioning system coupled to the build platform, the energy generating system, the powder application device, or a combination thereof, and configured to move the build platform, the energy generating system, the powder application device, or a combination thereof, relative to one another. The AM system includes an upper gas inlet disposed in a first side-wall and in an upper portion of the chamber and configured to supply an upper gas flow parallel to the build platform. The AM system includes a lower gas inlet in a lower portion of the chamber, wherein the lower gas inlet comprises one or more pairs of dividing walls extending from the first side-wall towards the build platform and configured to guide the lower gas flow at one or more flow angles with respect to the build platform. The AM system includes one or more gas delivery mechanisms coupled to the upper and lower gas inlets and configured to regulate one or more flow characteristics of the upper and lower gas flows. The AM system also includes a gas outlet, disposed in a second side-wall of the chamber, opposing the first side-wall, wherein the gas outlet is configured to discharge the upper and lower gas flows from the chamber.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. The term "uniform gas flow", as used herein, means that the flow velocity of a gas flow does not significantly vary across a path of the gas flow. As used herein, the term "additive manufacturing", relates to any suitable laser sintering/melting additive manufacturing technique, including, but are not limited to: Direct Metal Laser Melting, Direct Metal Laser Sintering, Direct Metal Laser Deposition, Laser Engineered Net Shaping, Selective Laser Sintering, Selective Laser Melting, Selective Heat Sintering, Fused Deposition Modeling, Hybrid Systems, or combinations thereof.

The present disclosure generally encompasses systems and methods for fabricating objects using a laser sintering/melting-based method of additive manufacturing. As mentioned, for such additive manufacturing techniques, when the laser beam sinters or melts the powder bed within an enclosed manufacturing chamber, smoke and/or particulate matter (e.g., condensate, spatter) is can accumulate within the chamber. As mentioned, this smoke and/or the particular matter may interact with the laser beam and/or the object being printed and interfere with the fabrication process. As such, it may be desirable to remove the smoke and/or the particular matter from the chamber to improve manufacturing process and/or the quality of the resulting object.

As discussed in detail below, some embodiments of the present disclosure present additive manufacturing (AM) systems and methods that employ a combination of an upper gas flow in an upper portion of the chamber and a lower gas flow in a lower portion of the chamber, wherein the lower gas flow is generally directed toward the build platform. The addition of the lower gas flow may advantageously overcome the above noted shortcomings of an AM system having only the upper gas flow by more efficiently removing the smoke and/or particulate matter from the chamber, as well as suppressing entrainment and recirculation of the smoke and/or the particulate matter inside the chamber of the AM system. As such, the stagnation and/or deposition of the smoke and/or particulate matter on various locations inside the chamber may be substantially reduced or eliminated, and thus may lead to improved quality of the resulting object of the AM process. In some embodiments, the lower gas flow may include multiple streams having different flow characteristics. The flow characteristics may include flow distribution, flow rate (e.g., mass flow rate, volume flow rate), flow velocity (e.g., in meters per second (m/s)), flow direction or angle, flow temperature, or any combination thereof. The flow velocities and/or other flow characteristics of the multiple streams may be controlled or tuned to desirable levels to interface with the upper gas flow. The controlled or tuned velocity gradients (and/or gradients in terms of other flow characteristics) may substantially reduce or eliminate the gas entrainment, which in turn, may enhance the efficiency of removing the smoke and/or particulate matter from the chamber.

Figure 1:
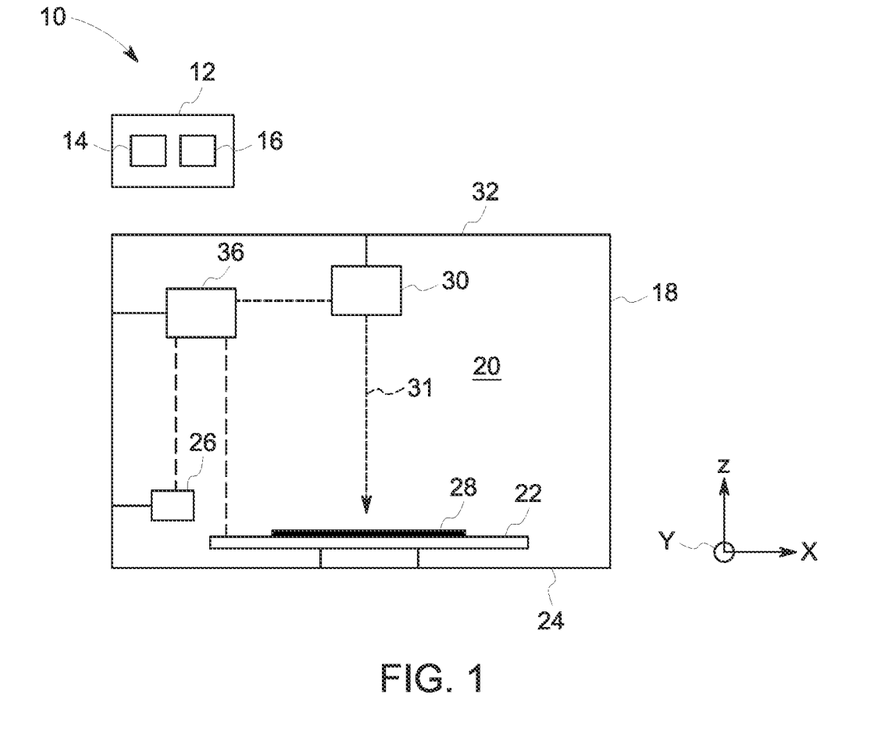
FIG. 1 is a schematic diagram of an embodiment of an additive manufacturing (AM) system having a manufacturing chamber, in accordance with present embodiments.

FIG. 1 illustrates an example embodiment of an AM system 10 (e.g., a laser sintering/melting AM system 10) for producing an article or object using a focused energy source or beam. In the illustrated embodiment, the AM system 10 includes a controller 12 having memory circuitry 14 that stores instructions (e.g., software, applications), as well as processing circuitry 16 configured to execute these instructions to control various components of the AM system 10. The AM system 10 includes a housing 18 defining a manufacturing chamber 20 (also referred to herein as chamber 20) having a volume. The chamber 20 is sealable to contain an inert atmosphere and to protect the build process from the ambient atmosphere. The AM system 10 includes a build platform 22 disposed inside the chamber 20 on a base portion or bottom-wall 24 of the housing 18. In some embodiments, the build platform 22 may have a working area (e.g., the top surface of the build platform 22) in a range between about 0.01 square meters (m$^2$) and about 1.5 m$^2$. The article or object of the AM process is fabricated on the build platform 22, as discussed below.

The AM system 10 includes a powder application device 26, which may be arranged inside the chamber 20 to deposit a quantity (e.g., a layer or bed) of a powder material onto the build platform 22. The powder material deposited on the build platform 22 generally forms a powder bed 28. The powder material may include, but is not limited to, polymers, plastics, metals, ceramics, sand, glass, waxes, fibers, biological matter, composites, or hybrids of these materials. These materials may be used in a variety of forms as appropriate for a given material and method, including for example without limitation, solids, powders, sheets, foils, tapes, filaments, pellets, wires, atomized, and combinations of these forms.

The AM system 10 includes an energy generating system 30, which may be arranged inside the chamber 20 for generating and selectively directing a focused energy beam 31, such as laser, onto at least a portion of the powder bed 28 disposed on the build platform 22. For the embodiment illustrated in FIG. 1, the energy generating system 30 is arranged in proximity to a top portion or top-wall 32 of the housing 18, opposite to the base portion or the bottom-wall 24. The powder bed 28 disposed on the build platform 22 is subjected to the focused energy beam 31 in a selective manner as controlled by the controller 12, depending on the desired geometry of the article. In some embodiments, the energy generating system 30 includes a focused energy source for generating the focused energy beam 31. In some embodiments, the focused energy source includes a laser source and the focused energy beam 31 is a laser beam. In some embodiments, the laser source includes a pulsed laser source that generates a pulsed laser beam. The pulsed laser beam is not emitted continuously, in contrast with a continuous laser radiation, but is emitted in a pulsed manner e.g., in time limited pulses with interval. In some embodiments, the energy generating system 30 includes a plurality of focused energy sources that is configured to selectively irradiate the powder bed 28 using the focused energy beam 31.

The AM system 10 includes a positioning system 36 (e.g., a gantry or other suitable positioning system), which may be arranged inside the chamber 20. The positioning system 36 may be any multidimensional positioning system, such as a delta robot, cable robot, robot arm, or another suitable positioning system. The positioning system 36 may be operatively coupled to the powder application device 26, the energy generating system 30, the build platform 22, or a combination thereof. The positioning system 36 may move the powder application device 26, the energy generating system 30, the build platform 22, or a combination thereof, relatively to one another, in any of the x-, y-, and z-directions, or a combination thereof.

The AM system 10 is further configured to supply an upper gas flow and a lower gas flow into the chamber 20 and discharge a gas flow from the chamber 20, as will be discussed in FIG. 2. The gas flow being discharged from the chamber 20 includes the upper gas flow, the lower gas flow, as well as a substantial portion of any smoke and/or particulate matter that is generated on application of the focused energy beam 31 to selectively melt or sinter the powder bed 28 during forming of desired article. By employing a combination of the upper and lower gas flows, gas entrainment and recirculation of the smoke and/or particulate matter may be substantially reduce or eliminated, substantially improving the quality of the build process and/or the article being printed.

Figure 2:
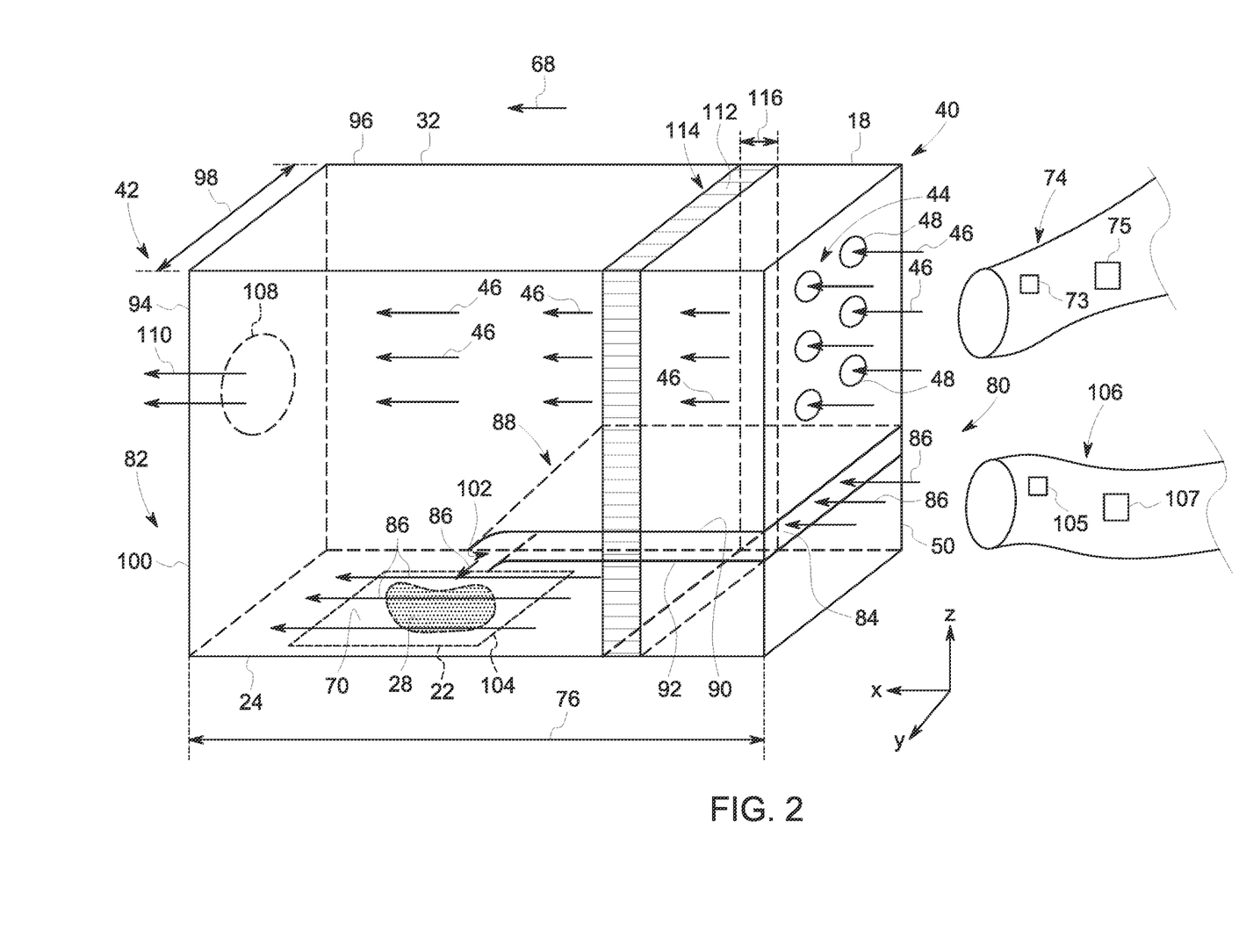
FIG. 2 is a schematic perspective view illustrating an embodiment of the manufacturing chamber of the AM system of FIG. 1 having both an upper gas flow arrangement and a lower gas flow arrangement having dividing walls configured to guide the lower gas flow, in accordance with present embodiments.

FIG. 2 is a schematic perspective view illustrating an embodiment of the chamber 20 of the AM system 10, in accordance with present embodiments. As illustrated, the AM system 10 includes an upper gas flow system 40 arranged in an upper portion 42. In some embodiments, the upper portion 42 may include upper 50%, upper 60%, upper 70%, or upper 80% in the z-direction of the chamber 20. The upper gas flow system 40 may be integrated with and/or coupled to the housing 18. The upper gas flow system 40 includes an upper gas inlet 44 for supplying an upper gas flow 46 to the chamber 20. For the illustrated embodiment, the upper gas inlet 44 includes a plurality of openings 48 in a side-wall 50 of the housing 18. The plurality of openings 48 may include an array of openings that allow the upper gas flow 46 to flow substantially uniformly along a direction 68 (e.g., parallel to the x-direction, parallel to a top 70 surface of the build platform 22, perpendicular to the z-direction). The plurality of openings 48 may be of any suitable shape and size that enable substantially uniform gas flow. In some embodiments, the plurality of openings 72 may be in the form of circular holes, as illustrated in FIG. 2. In some embodiments, the upper gas inlet 44 may include only one opening having any suitable shape. Further, the upper gas inlet 44 may be coupled to an upper gas delivery mechanism 74 that is in turn, coupled to a gas supply line. The upper gas delivery mechanism 74 may help uniformly supply the upper gas flow 46 through an entire length 76 of the chamber 20.

The embodiment of the AM system 10 shown in FIG. 2 also includes a lower gas flow system 80 arranged in a lower portion 82. In some embodiments, the lower portion 82 may include lower 50%, lower 40%, lower 30%, or lower 20% in the z-direction of the chamber 20. The lower gas flow system 80 may be integrated with and/or coupled to the housing 18. The lower gas flow system 80 includes lower gas inlet 84 for supplying a lower gas flow 86 to the chamber 20. For the illustrated embodiment, the lower gas inlet 84 is defined by dividing walls 88 (e.g., an upper dividing wall 90 and a lower dividing wall 92) extending in the y-direction from a side-wall 94 to a side-wall 96 of the housing 18, through the entire width 98 of the chamber 20. The illustrated dividing walls 88 also extend in the x-direction from the side-wall 50 toward a side-wall 100 of the housing 18 through a least a portion of the length 76 of the chamber 20. The lower gas inlet 84 is arranged such that the lower gas flow 86 is guided between the dividing walls 88 to flow toward the build platform 22. The dividing walls 88 are arranged such that the lower gas flow 86 exits at a lower gas outlet 102 that is in close proximity to the build platform 22. In some embodiments, the lower gas outlet 102 may be about 50 centimeter (cm) to about 0.5 cm, about 30 cm to about 0.5 cm, about 20 cm to about 0.5 cm, about 20 cm, or about 10 cm to about 0.5 cm to the build platform 22 (e.g., in the z-direction). The lower gas flow 86 exiting the lower gas inlet 84 flows generally uniformly along the direction 68 (e.g., parallel to the x-direction, parallel to a top 70 surface of the build platform 22, perpendicular to the z-direction).

Furthermore, the lower gas inlet 84 is arranged, such that the presence of the dividing walls 88 does not interfere with movements and operations of the various components of the AM system 10. For example, the presence of the dividing walls 88 does not interfere with movements (e.g., in the x-, y-, z-direction or a combination thereof) and operations of the powder application device 26. In some embodiments, the dividing walls 88 may be arranged above (e.g., in the z-direction) the powder application device 26 (shown in FIG. 1). In some embodiments, the lower gas outlet 102 may be adjacent (e.g., in the x-direction) and in close proximity (e.g., within about 30 cm to about 20 cm, about 25 to about 15 cm, or about 20 cm) to an edge 104 of the build platform 22. In some embodiments, the lower gas outlet 102 may be slightly above (e.g., in the z-direction) and in close proximity (e.g., about 50 cm to about 0.5 cm, about 30 cm to about 0.5 cm, about 20 cm to about 0.5 cm, about 20 cm, or about 10 cm to about 0.5 cm to the build platform 22) to the edge 104 of the build platform 22.

In some embodiments, the lower gas inlet 84 may include more than two dividing walls 88 (e.g., 3, 4, 5, 6, 7, 8, or any suitable numbers) adjacent to one another in the z-direction such that the lower gas flow 86 may include multiple (e.g., 2, 3, 4, 5, 6, 7, or any suitable numbers) streams. The multiple streams exiting the lower gas inlet 84 may flow generally uniformly along the direction 68 (e.g., parallel to the x-direction, parallel to a top 70 surface of the build platform 22, perpendicular to the z-direction). The lower gas inlet 84 may be coupled to a lower gas delivery mechanism 106 that is in turn, coupled to a gas supply line. The lower gas delivery mechanism 106 may help uniformly supply the lower gas flow 86 through a significant portion of the entire length 76 of the chamber 20.

The AM system 10 as shown in FIG. 2, also includes a gas outlet 108 for discharging a gas flow 110 from the chamber 20. The discharged gas flow 110 may include the upper gas flow 46, the lower gas flow 86, as well as a substantial portion of any smoke and/or particulate matter that is generated during the AM process. In the illustrated embodiment, the gas outlet 108 is arranged at the side-wall 100 of the housing 18, opposing the side-wall 50 where the upper and lower gas flows 46 and 86 enter the chamber 20. The gas outlet 108 may be arranged toward the upper portion of the side-wall 100 such that the upper gas flow 46 travels directly, tangentially above the build platform 22. In some embodiments, the upper portion of the side-wall 100 may include upper 50%, 40%, 30%, 20%, or 10% of the side-wall 100. While the gas outlet 108 is illustrated as being circular in shape in FIG. 2 for simplicity, the gas outlet 108 can be of any suitable shape (e.g., rectangular, polygon, oval) that enables sufficient discharging of the gas flow 110. In some embodiments, the gas outlet 108 may include a plurality of openings on the side-wall 100 to discharge the gas flow 110. The gas outlet 44 may be coupled to a suction mechanism to draw and discharge the gas flow 110 from the chamber 20.

For the illustrated embodiment, the AM system 10 also includes a flow conditioning device 112 configured to help regulating flow characteristics of the upper gas flow 46 and the lower gas flow 86. The flow characteristics may include flow distribution, flow rate (e.g., mass flow rate, volume flow rate), flow velocity (e.g., in meters per second (m/s)), flow direction or angle, flow temperature, or any combination thereof. For example, the flow conditioning device 112 may be disposed within the housing 18 (e.g., to form fit the inner walls of the housing 18, extending from the top-wall 32 to the bottom-wall 24 of the housing 18 in the z-direction and/or extending from the side-wall 94 to the side-wall 96 of the housing 18 in the y-direction) adjacent to the upper and lower gas inlets 44 and 84, such that the upper and lower gas flows 46 and 86 pass through separate portions of the flow conditioning device 112 before flowing over the build platform 22 as described above. The flow characteristics of the upper and lower gas flows 46 and 86 are separately conditioned by the flow conditioning device 112 to desired levels for removing the smoke and/or particulate matter (e.g., condensate, spatter) from the chamber 20. For example, the flow conditioning device 112 may have a plurality of openings 114 extending through a thickness 116 (e.g., any suitable value). The plurality of openings 112 may be arranged and shaped (e.g., honeycomb-like structure, sponge-like structure) to allow the upper and lower gas flows 46 and 86 passing through the thickness 116 and condition the flow characteristics of the upper and lower gas flows 46 and 86 in desired ranges (e.g., the flow characteristics are influenced by the sizes, shapes, and/or arrangements of the plurality of openings 114). In some embodiments, the flow conditioning device 112 may be omitted.

The upper gas flow 46 and the lower gas flow 86 include inert gas (e.g., argon, nitrogen, or the like, or a combination thereof). The upper and lower gas flows 46 and 86 may be supplied to the chamber 20 via the upper and lower gas delivery mechanisms 74 and 106, respectively, including one or more suitable conveying devices and/or flow regulating devices such as, one or more fluid valves 73 and 105, one or more pumps or blowers 75 and 107, or a combination thereof. In some embodiments, the upper and lower gas delivery mechanisms 76 and 106 may be the same gas delivery mechanism (e.g., the one or more pumps or blowers 75 and 107 are the same pumps or blowers delivering the upper and lower gas flows 46 and 86 to the upper and lower gas inlets 44 and 84, the one or more fluid valves 73 and 105 are the same fluid valves regulating the upper and lower gas flows 46 and 86 prior to entering the upper and lower gas inlets 44 and 84). In some embodiments, the suction mechanism coupled to the gas outlet 108 may include a suitable filtration mechanism to filter or treat the discharged gas flow 110 and to recirculate the filtered gas flow 110 back to the chamber 20 through the upper gas inlet 44 and/or the lower gas inlet 84.

In addition, the upper and lower gas delivery mechanisms 74 and 106 may be operatively coupled to the controller 12, which is configured to control the upper and lower gas flows 46 and 86, in addition to the remainder of the AM system 10. The controller 12 may be configured to control one or more fluid flow characteristics of the upper and lower gas flows 46 and 86 to substantially reduce or eliminate gas entrainment or chaotic gas flow within the chamber 20, such that the smoke and/or particulate matter (e.g., condensate, spatter) may be effectively removed from the chamber 20 (e.g., discharged from the chamber 20 via the gas outlet 108). The flow characteristics may include flow distribution, flow rate (e.g., mass flow rate, volume flow rate), flow velocity, flow direction or angle, flow temperature, or any combination thereof. For example, the controller 12 may control operations of the upper gas delivery mechanism 74 (e.g., the one or more fluid valves 73, the one or more pumps or blowers 75) and the lower gas delivery mechanism 106 (e.g., the one or more fluid valves 105, the one or more pumps or blowers 107) to control flow characteristics of the upper and lower gas flows 46 and 86. In some embodiments, the flow velocity of the lower gas flow 86 may be greater than the flow velocity of the upper gas flow 46. In some embodiments, the flow velocity of the lower gas flow 86 may be in a range about 10 times and about 1.5 times the flow velocity of the upper gas flow 46. In some embodiments, the flow velocity of the lower gas flow 86 may be in a range about 9 times and about 7 times the flow velocity of the upper gas flow 46 the 8 times the flow velocity of the upper gas flow 46. In some embodiments, the flow velocity of the lower gas flow 86 may be in a range about 8 times the flow velocity of the upper gas flow 46. In some embodiments, the flow velocity of the upper gas flow 46 may be in a range between about 0.2 m/s and 1 m/s and the flow velocity of the lower gas flow 86 may be in a range between about 2 m/s and 5 m/s. In certain embodiments, the flow velocity of the upper and lower gas flows 46 and 86 combined may be in a range between about 50 cubic meters per hour (m³/h) and about 1000 m³/h. The flow velocity of the upper and lower gas flows 46 and 86 combined may vary depending on the volume of the chamber 20. It should be noted that because the AM system 10 employs a combination of the upper and lower gas flows 46 and 86, a relatively smaller or less powerful pump or blower may be used for delivering the upper gas flow 46 (e.g., smaller or less powerful relative to the case that the AM system 10 only employs the upper gas flow 46, not the lower gas flow 86) in certain embodiments.

Figure 3:
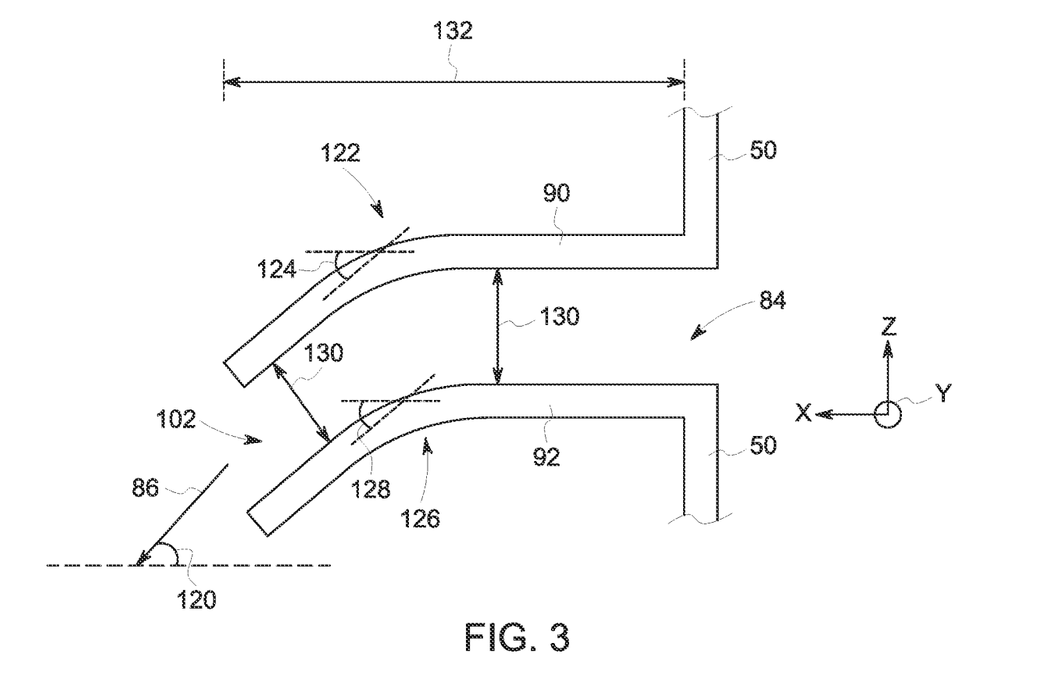
FIG. 3 is a cross-sectional schematic diagram of an embodiment of the dividing walls of the AM system of FIG. 2 having relatively weak nozzle effects, in accordance with present embodiments.

As set forth above, the combination of the upper gas flow 46 and the lower gas flow 86 may help substantially reduce or eliminate gas entrainment and chaotic gas flow, and thus improve the performance and efficiency of the AM system 10 by removing smoke and/or other particulates generated during the AM process. FIG. 3 is a schematic cross-sectional view illustrating an embodiment of the dividing walls 88 for guiding the lower gas flow 86. In the illustrated embodiment, the dividing walls 88 include the upper dividing wall 90 and the lower dividing wall 92 configured to guide the lower gas flow 86 to flow from the lower gas inlet 84 toward the build platform 22 (shown in FIG. 2). The dividing walls 88 may be shaped such that the lower gas flow 86 exits the lower gas outlet 102 at a flow angle 120 (e.g., with respect to the build platform 22 of FIG. 2, with respect to the x-direction). The dividing walls 88 may be made of any suitable material (e.g., metals, alloys, plastics, composites) that has sufficient mechanical strength and structural integrity to maintain their shapes. In the illustrated example, the upper dividing wall 90 has a bending point 122 where the upper dividing wall 90 bends at a bending angle 124 (e.g., with respect to the x-direction) toward the build platform 22, and the lower dividing wall 92 has a bending point 126 where the lower dividing wall 92 bends at a bending angle 128 (e.g., with respect to the x-direction) toward the build platform 22. In certain embodiments, the bending angles 124 and 128 may be substantially the same, and the bending points 122 and 126 may be at about the same location (e.g., with respect to the x-direction), such that a width 130 of the lower gas flow 86 path between the upper and lower dividing walls 90 and 92 is substantially constant along a length 132 of the dividing walls 88. In other embodiments, the width 130 may vary (e.g., increase, decrease) along the length 132 of the dividing walls 88.

It should be noted that the shapes of the dividing walls 88 may be modified to change the flow characteristics (e.g., flow distribution, flow rate, flow velocity, flow direction or angle, flow temperature, or a combination thereof) of the lower gas flow 86 and/or the location of the lower gas outlet 102 (e.g., relative to the build platform 22). As an example, one or more parameters including the locations of the bending points 122 and 126, the bending angles 124 and 128, the width 130, and the length 132 may be modified to change to the flow angle 120 of the lower gas flow 86. In some embodiments, the flow angle 120 may be in a range between about 40 degrees and about 1 degree, about 25 degrees and about 1 degree, about 30 degrees and about 5 degrees, about 30 degrees and about 20 degrees, and about 20 degrees and about 10 degrees.

Figure 4:
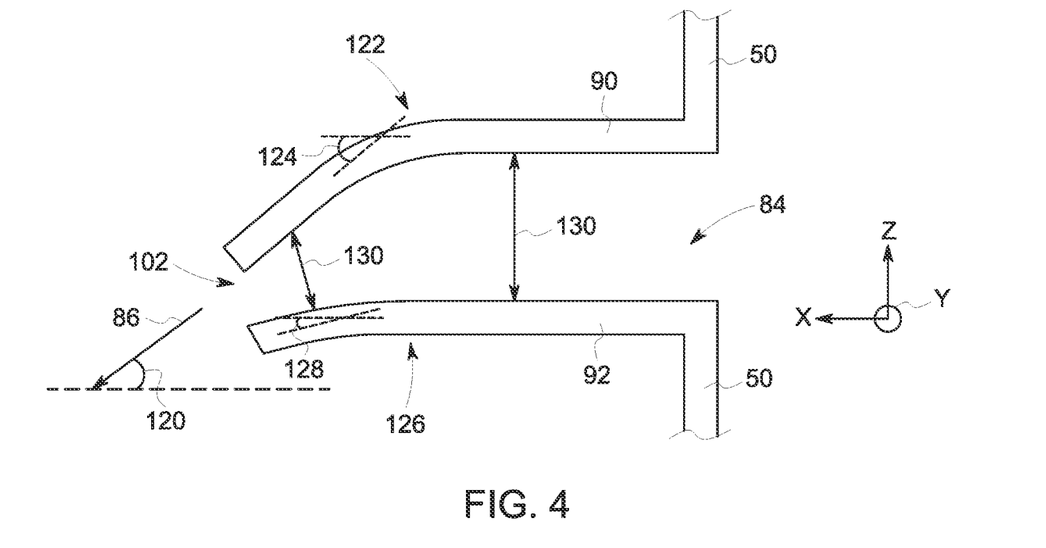
FIG. 4 is a cross-sectional schematic diagram of an embodiment of the dividing walls of the AM system of FIG. 2 having relatively strong nozzle effects, in accordance with present embodiments.

As another example, the dividing walls 88 may be shaped to have strong nozzle effects to change or adjust the flow characteristics of the lower gas flow 86. FIG. 4 is a schematic cross-sectional view illustrating an example of the dividing walls 88 having relatively stronger nozzle effects, in comparison to dividing walls 88 of FIG. 3. For the illustrated embodiment, the bending angle 124 of the upper dividing wall 90 is greater than the bending angle 128 of the lower dividing wall 92, such that the width 130 of the lower gas flow 86 path decreases along the length 132 of the dividing walls 88 toward the lower gas outlet 102, which in turn, creates relatively stronger nozzle effects to influence the flow characteristics of the lower gas flow 86. Herein, a relatively sharper decrease in the width 130 along the length 132 toward the lower gas outlet 102 enables the relatively stronger nozzle effects. The flow velocity and/or flow rate of the lower gas flow 86 may increase with increasing (stronger) nozzle effects.

Figure 5:
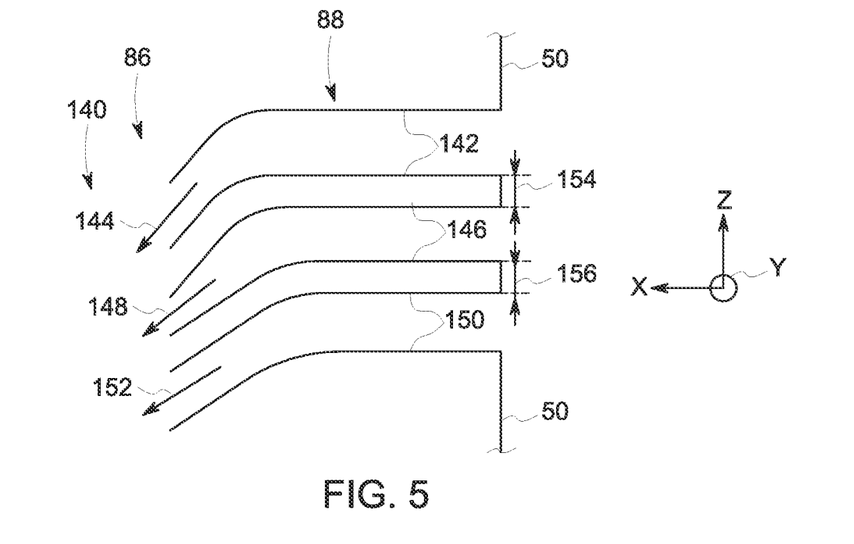
FIG. 5 is a cross-sectional schematic diagram of an embodiment of the dividing walls of the AM system of FIG. 2 configured to guide the lower gas flow into multiple streams having generally the same shape, in accordance with present embodiments.

Furthermore, as set forth above, the lower gas inlet 84 may include more than two dividing walls 88 adjacent to one another in the z-direction, such that the lower gas flow 86 includes multiple streams. FIG. 5 is a schematic cross-sectional view illustrating an example embodiment in which the dividing walls 88 are configured to guide the lower gas flow 86 into multiple streams 140. In the illustrated embodiment, the dividing walls 88 include a first pair of dividing walls 142 to guide a first stream of flow 144, a second pair of dividing walls 146 to guide a second stream of flow 148, and a third pair of dividing walls 150 to guide a third stream of flow 152. The first pair of dividing walls 142 is separated from the second pair of dividing walls 146 by a distance 154 (e.g., in the z-direction) and the second pair of dividing walls 146 is separated from the third pair of dividing walls 150 by a distance 156. The distances 154 and 156 may be the same or different, and may be any suitable values. In some embodiments, three dividing walls 88 can form two pairs of dividing walls to guide two streams 140. While only three pairs of dividing walls are illustrated, the dividing walls 88 may include any suitable number of pairs (e.g., 2, 3, 4, 5, 6, or more) of dividing walls to create any suitable number (e.g., 1, 2, 4, 5, 6, or more) of the multiple streams 140. For the illustrated embodiment, the multiple streams 140 have distinct flow paths that are generally parallel or laminar to one another.

Figure 6:
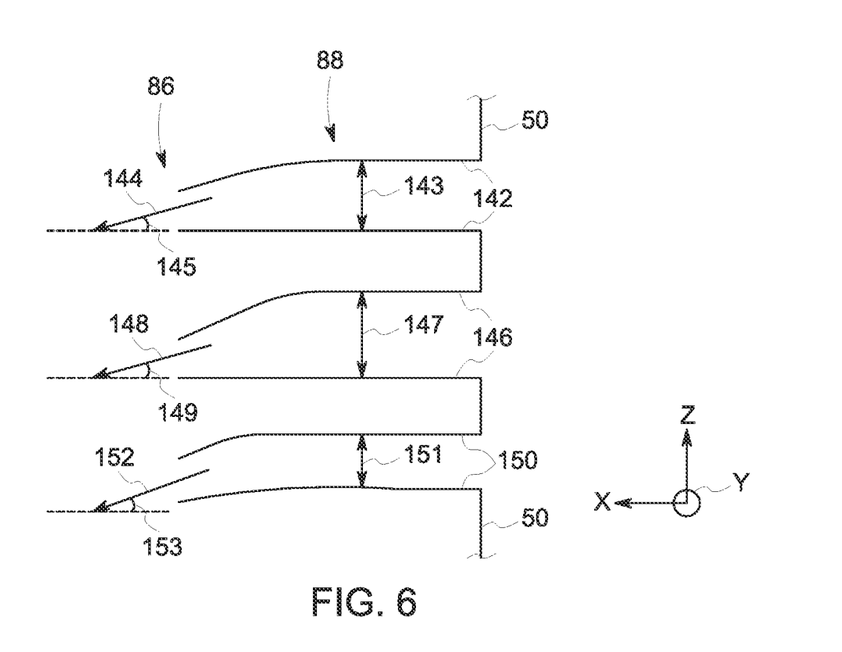
FIG. 6 is a cross-sectional schematic diagram of another embodiment of the dividing walls of the AM system of FIG. 2 configured to guide the lower gas flow into multiple streams having different shapes, in accordance with present embodiments.

It should be noted that the variations in shapes and nozzle effects of the dividing walls 88, as discussed in FIGS. 3 and 4, are also applicable to multiple pairs of dividing walls (e.g., the first, second, and third pairs of dividing walls 142, 146, and 150 of FIG. 6). In some embodiments, the multiple pairs of dividing walls 88 (e.g., the first pair of walls 142, the second pair of walls 146, and the third pair of walls 150) may have substantially the same shape and/or the same nozzle effects. In certain embodiments, the multiple pairs of dividing walls 88 (e.g., the first pair of dividing walls 142, the second pair of dividing walls 146, and the third pair of dividing walls 150) may have different shapes and/or different nozzle effects, as illustrated in FIG. 6. For the illustrated embodiment, the second pair of dividing walls 146 is shaped to have stronger nozzle effects than the first pair of dividing walls 142 and/or the third pair of dividing walls 150. In some embodiments, the multiple pairs of dividing walls 88 may be shaped, such that widths 143, 147, and 151 of the flow paths of the first, second, and third streams 144, 148, and 152, respectively, are different from one another. For example, the width 147 may be greater than the width 143 and/or the width 151. In some embodiments, the multiple pairs of dividing walls 88 may be shaped such that flow angles 144, 149, and 153 of the first, second, and third streams 144, 148, and 152, respectively, are different from one another. For example, the flow angle 153 may be greater than the flow angle 149 and/or the flow angle 145.

It should be noted that the multiple dividing walls 88 (e.g., the first pair of dividing walls 142, the second pair of dividing walls 146, and the third pair of dividing walls 150) may be shaped to collectively change the flow characteristics of the lower gas flow 86 in relation to the flow characteristics of the upper gas flow 46. In particular, the flow characteristic of multiple streams 140 of the lower gas flow 86 may be tuned (e.g., by changing the shapes of the multiple dividing walls 88, by changing operations of the second gas delivery mechanism 106) to create a flow gradient (e.g., gradient in terms of flow velocity or flow rate), such that the upper gas flow 46 and the lower gas flow 86 are efficiently interfaced with one another, and the combination of the upper and lower gas flows 46 and 88 may substantially reduce or eliminate gas entrainment, efficiently removing smoke and/or particulates from the chamber 20.

With reference to FIGS. 2, 5, and 6, in some embodiments, the multiple streams 140 may be coupled to the same gas delivery mechanism (e.g., the second gas delivery mechanism 106), such that the multiple streams 140 are delivered from the same pump or blower 107 and/or through the same fluid valve 105, as illustrated in FIG. 2. Additionally, the one or more flow characteristics of the multiples streams may be individually regulated via different shapes of the multiple pairs of dividing walls 88 (e.g., the first pair of dividing walls 142, the second pair of dividing walls 146, and the third pair of dividing walls 150 of FIG. 6). In some embodiments, the multiples streams (e.g., the first, second, and third streams 144, 148, and 152 of FIGS. 5 and 6) may be delivered from different pumps 107 and/or different fluid valves 105, such that the one or more flow characteristics of the multiple streams 140 may be individually regulated via applications of the different pumps 107 and/or different fluid valves 105 illustrated in FIG. 2. In some embodiments, the flow conditioning device 112 of FIG. 2 may be configured to help individually regulating the flow characteristics of the multiple streams 140 of FIGS. 5 and 6. For example, the sizes and/or shape of the plurality of openings 114 and/or the thickness 116 of the flow conditioning device 112, as illustrated in FIG. 2 may vary locally for the respective flow paths of the multiple streams 140 of FIGS. 5 and 6 to individually regulate the flow characteristics.

In some embodiments, the multiple dividing walls 88, the gas delivery mechanism 106, and/or the flow conditioning device 112 are configured or operated to form a flow gradient. For example, the multiple streams 140 closer to the build platform 22, such as the third stream of flow 152, may have a first medium flow velocity. For example, the multiple streams 140 slightly away from the platform 22 in the z-direction, such as the second stream of flow 148, may have a high flow velocity. For example, the multiple streams 140 closer to the upper gas flow 46 in the z-direction, such as the first stream of flow 144, may have a second medium flow velocity. The first medium flow velocity for the third stream of flow 152 may be any suitable flow velocity to avoid significant disturbance to the powder bed 28, the high flow velocity for the second stream of flow 148 may be any suitable flow velocity to quickly blow away the smoke and/or particulates, and the second medium flow velocity for the first stream of flow 144 may be any suitable flow velocity to avoid gas entrainment due to large flow velocity gradient at the flow boundary between the upper and lower gas flows 46 and 86. In certain embodiments, the flow velocity of the multiple streams 140 may decrease toward the upper gas flow 46 (e.g., the third stream of flow 152 has a greater flow velocity than the second stream of flow 148, which has a greater flow velocity than the first stream of flow 144). In certain embodiments, the flow velocity of the multiple streams 140 adjacent to the platform 22, such as the third stream of flow 152, may be about 8 times the flow velocity of the upper gas flow 46.

Figure 7:
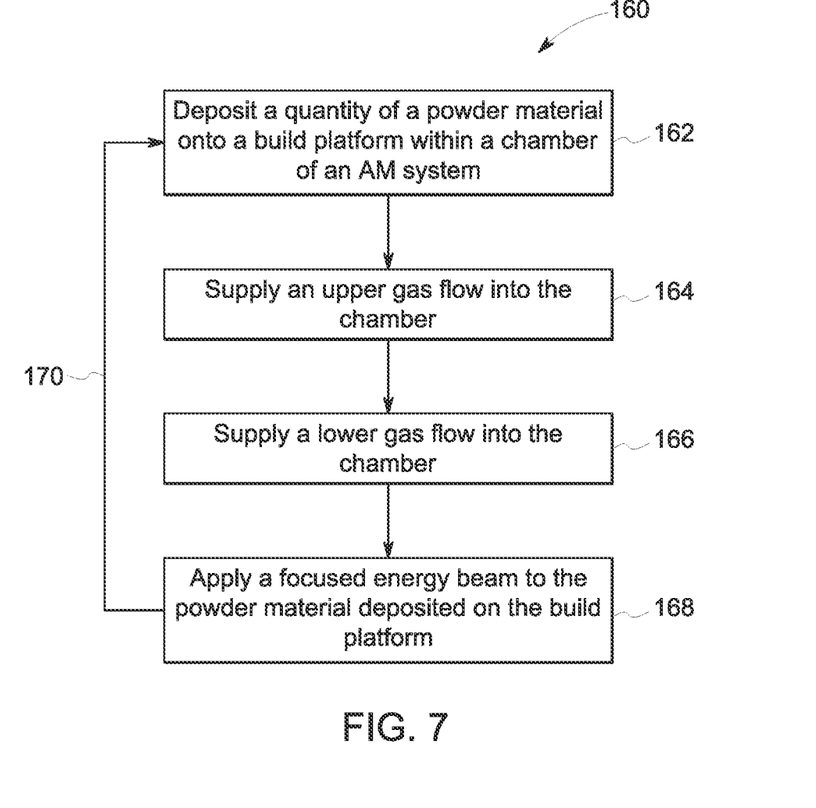
FIG. 7 is a flow chart of an embodiment of a method for operating the AM system of FIG. 2, in accordance with present embodiments.

FIG. 7 is a flow chart of an embodiment of a method 160 for operating the AM system 10. One or more of the steps of the method 160 stored in the memory circuitry 14 may be executed by the processor 16 of the controller 12. Referring to the AM system 10 of FIGS. 1 and 2, the method 160 includes depositing (step 162) a quantity of a powder material onto the build platform 22 within the chamber 20 of the AM system 10. For example, the controller 12 instructs the powder application device 26 to deposit the powder material onto the build platform 22. The controller 12 instructs the positioning system 36 to move the powder application device 26 and/or the platform 22 to any suitable positions relative to one another, in any of the x-, y-, and z-direction, or a combination of, to deposit the powder material in a layer-by-layer manner.

In the illustrated embodiment, the method 160 includes supplying (step 164) an upper gas flow into the chamber 20. For example, the controller 12 instructs the associated gas delivery mechanism (e.g., the first gas delivery mechanism 74) to supply the upper gas flow 46 into the chamber 20. By way of specific example, the controller 12 instructs the associated gas delivery mechanism to control the flow characteristics of the upper gas flow 46, such as flow distribution, flow rate (e.g., mass flow rate, volume flow rate), flow temperature, or any combination thereof. In certain embodiments, the controller 12 instructs the associated gas delivery mechanism to control content (e.g., argon, nitrogen, any other suitable inert gas, or a combination thereof) of the upper gas flow 46. In some embodiments, the controller 12 instructs the associated gas delivery mechanism to supply the upper gas flow 46 into the chamber 20 simultaneous to step 162.

The illustrated embodiment of the method 160 includes supplying (step 166) the lower gas flow 86 into the chamber 20. For example, the controller 12 instructs the associated gas delivery mechanism (e.g., the second gas delivery mechanism 106) to supply the lower gas flow 86 into the chamber 20. By way of specific example, the controller 12 instructs the associated gas delivery mechanism to control the flow characteristics of the lower gas flow 86, such as flow distribution, flow rate (e.g., mass flow rate, volume flow rate), flow temperature, or any combination thereof. In some embodiment, the controller 12 instructs the associated gas delivery mechanism to control the flow characteristics of the multiple streams 140 to create a flow gradient (e.g., gradient in terms of flow velocity or flow rate) in the lower gas flow 86. In certain embodiments, the controller 12 instructs the associated gas delivery mechanism to control content (e.g., argon, nitrogen, any other suitable inert gas, or a combination thereof) of the lower gas flow 86. The controller 12 may instruct the associated gas delivery mechanisms to control the flow velocities of the upper gas flow 46 and the lower gas flow 86, such that a ratio between the two gas flow velocities is controlled at a desirable value or range (e.g., the flow velocity of the lower gas flow 86 is in a range between about 10 times and about 1.5 times the flow velocity of the upper gas flow 46, between about 9 times and about 7 times the flow velocity of the upper gas flow 46, about 8 times the flow velocity of the upper gas flow 46). In certain embodiments, the controller 12 instructs the associated gas delivery mechanisms to control the flow velocities of the upper gas flow 46 and the lower gas flow 86, such that ratios between the upper gas flow 46 and each individual stream of the multiple streams 140 are controlled at a desirable value or range. For example, the controller 12 may instruct the associated gas delivery mechanisms to control the flow velocities of the upper gas flow 46 and the lower gas flow 86, such that the flow velocity of the upper gas flow 46 is in a range between about 0.2 m/s and 1 m/s and the flow velocity of the lower gas flow 86 is in a range between about 2 m/s and 5 m/s. As set forth above, applying the lower gas flow 86 in the chamber 20 (step 166), in combination with the upper gas flow 46 (step 164) may substantially reduce or eliminate gas entrainment and chaotic flow inside the chamber 20 and more efficiently remove the smoke and/or particulate matter from the chamber 20, which may lead to improved quality of the resulting object manufactured by the AM system 10.

The illustrated embodiment of the method 160 includes selectively applying (step 168) a focused energy beam to the quantity of a powder material deposited on the build platform 22. For example, the control 12 instructs the energy generating system 30 to apply the focused energy beam 31, such as a laser beam, to portions of the powder bed 28. The focused energy beam 31 selectively melts and/or sinters the powder material of the powder bed 28 in a predefined manner to form a solidified layer.

In some embodiments, the steps 164 and 166 may be performed simultaneously. In some embodiments, the step 164 may be performed before or after the step 166. In some embodiments, the step 168 may be performed simultaneously to the step 164, the step 166, or both. In some embodiments, the step 168 may be performed before the step 164 or before the step 166. In some embodiments, the method 160 may repeat the steps 162, 164, 166, and 168 to form additional solidified layer on the previously formed solidified layer, as indicated by an arrow 170. In some embodiments, the method 160 may include performing the steps 164 and 166 every time after performing the step 168. In some embodiments, the method 160 may include repeating the steps 162, 164, 166, and 168 multiple times to form successive additional solidified layers to form the desired article (e.g., the step 168 is performed while the steps 164 and 166 are performed continuously).

The technical effects of the present disclosure include improving the performance and efficiency of an AM system by removing from the chamber, smoke and/or other particulate matter generated during the AM process. The disclosed AM system employs a combination of an upper gas flow supplied from a side in the upper portion of the chamber directed parallel to a build platform, and a lower gas flow supplied from the side in the lower portion of the chamber directed toward the build platform. The lower gas flow may include one or more parallel streams. The flow velocities of the upper and lower gas flows are tuned with respect to one another within a desirable range. The combination of the upper and low gas flows, as well as fine tuning of their relative flow velocities may substantially reduce or eliminate gas entrainment and recirculation of the smoke and/or the particulate matter inside the chamber.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An additive manufacturing system, comprising:
a housing defining a chamber;
a build platform disposed in a lower portion of the chamber;
a powder application device configured to deposit a bed of powder material on the build platform;
an upper gas inlet disposed in a first side-wall and in an upper portion of the chamber and configured to supply an upper gas flow parallel to the build platform;
a lower gas inlet in the lower portion of the chamber, wherein the lower gas inlet comprises one or more pairs of dividing walls extending from the first side-wall toward the build platform and configured to guide a lower gas flow at one or more flow angles with respect to the build platform, wherein an upper dividing wall has a bending point where the upper dividing wall bends at a bending angle toward the build platform, and a lower dividing wall has a bending point where the lower dividing wall bends at a bending angle toward the build platform;
one or more gas delivery mechanisms coupled to the upper and lower gas inlets and configured to regulate one or more flow characteristics of the upper and lower gas flows; and
a gas outlet disposed in a second side-wall of the chamber, opposing the first side-wall, wherein the gas outlet is configured to discharge the upper and lower gas flows from the chamber.

2. The additive manufacturing system of claim 1, wherein a width between at least one of the one or more pairs of dividing walls narrows along a length of the at least one pair of dividing walls to provide a nozzle effect.

3. The additive manufacturing system of claim 1, wherein the one or more flow angles are between about 30 degrees and about 1 degree.

4. The additive manufacturing system of claim 1, comprising a flow conditioning device disposed within the chamber, such that the upper gas flow, the lower gas flow, or both, flow through the flow conditioning device, wherein the flow conditioning device is configured to regulate one or more flow characteristics of the upper gas flow, the lower gas flow, or both.

5. The additive manufacturing system of claim 1, wherein the lower gas flow and the upper gas flow are supplied into the chamber at a flow velocity ratio that is between about 10:1 and about 1.5:1.

6. The additive manufacturing system of claim 5, wherein the flow velocity ratio that is between about 9:1 and about 7:1.

7. The additive manufacturing system of claim 6, wherein the flow velocity ratio that is about 8:1.

8. The additive manufacturing system of claim 1, wherein the lower gas flow comprises multiple streams and each of the multiple streams is guided by one of the one or more pairs of dividing walls.

9. The additive manufacturing system of claim 8, wherein the multiple streams are supplied into the chamber at different respective flow velocities.

10. The additive manufacturing system of claim 8, wherein the multiple streams comprise:
a first stream of flow directly adjacent to the upper gas flow;
a second stream of flow at a lower vertical height than the first stream of flow; and
a third stream of flow at a lower vertical height than the second stream of flow, wherein the second stream of flow has a higher flow velocity than flow velocities of the first stream of flow and the third stream of flow.

11. The additive manufacturing system of claim 1, wherein the lower gas inlet is disposed at a greater vertical height than the powder application device.

12. A method of operating an additive manufacturing system, comprising:
depositing a bed of a powder material on a build platform within a chamber;
supplying an upper gas flow into the chamber horizontally above the build platform;
supplying a lower gas flow into the chamber toward the build platform via a lower gas inlet disposed in the lower portion of the chamber, wherein the lower gas inlet comprises one or more pairs of dividing walls extending from a first side-wall toward the build platform that guide the lower gas flow at one or more flow angles with respect to the build platform, and wherein an upper dividing wall has a bending point where the upper dividing wall bends at a bending angle toward the build platform, and a lower dividing wall has a bending point where the lower dividing wall bends at a bending angle toward the build platform; and
applying a focused energy beam to at least a portion of the bed of the powder material deposited on the build platform to form a solidified layer.

13. The method of claim 12, wherein supplying the lower gas flow comprises supplying the lower gas flow at a second flow velocity that is between about 10 times and about 1.5 times a first flow velocity of the upper gas flow, between about 9 times and about 7 times the first flow velocity of the upper gas flow, or about 8 times the first flow velocity of the upper gas flow.

14. The method of claim 12, wherein supplying the lower gas flow comprises supplying multiple streams into the chamber at different flow velocities.

15. The method of claim 12, wherein supplying the lower gas flow comprises supplying the lower gas flow simultaneously with supplying the upper gas flow.

16. An additive manufacturing system, comprising:
a housing defining a chamber;
a build platform disposed in the chamber;
a powder application device arranged in the chamber and configured to dispose a bed of powder material onto the build platform;
an energy generating system arranged in the chamber and configured to generate and direct a focused energy beam onto at least a portion of the bed of powder material;
a positioning system coupled to the build platform, the energy generating system, the powder application device, or a combination thereof, and configured to move the build platform, the energy generating system, the powder application device, or a combination thereof, relative to one another;
an upper gas inlet disposed in a first side-wall and in an upper portion of the chamber and configured to supply an upper gas flow parallel to the build platform;
a lower gas inlet in a lower portion of the chamber, wherein the lower gas inlet comprises one or more pairs of dividing walls extending from the first side-wall toward the build platform and configured to guide a lower gas flow at one or more flow angles with respect to the build platform, wherein an upper dividing wall has a bending point where the upper dividing wall bends at a bending angle toward the build platform, and a lower dividing wall has a bending point where the lower dividing wall bends at a bending angle toward the build platform;
one or more gas delivery mechanisms coupled to the upper and lower gas inlets and configured to regulate one or more flow characteristics of the upper and lower gas flows; and
a gas outlet, disposed in a second side-wall of the chamber, opposing the first side-wall, wherein the gas outlet is configured to discharge the upper and lower gas flows from the chamber.

17. The additive manufacturing system of claim 16, wherein a width between at least one of the one or more pairs of dividing walls narrows along a length of the at least one pair of dividing walls to provide a nozzle effect.

18. The additive manufacturing system of claim 16, wherein the one or more flow angles are between about 40 degrees and about 1 degree or between about 30 degrees and about 20 degrees.

19. The additive manufacturing system of claim 16, wherein the lower gas flow and the upper gas flow are supplied into the chamber at a flow velocity ratio that is between about 10:1 and about 6:1, between about 9:1 and about 7:1, or about 8:1.

20. The additive manufacturing system of claim 16, wherein the lower gas flow comprises multiple streams and each of the multiple streams is guided by a particular pair of dividing walls of the one or more pairs of dividing walls.

21. The additive manufacturing system of claim 16, wherein the multiple streams are supplied into the chamber at different flow velocities.

22. The additive manufacturing system of claim 16, wherein the lower gas inlet is disposed at a greater vertical height than the powder application device.

* * * * *